US006483921B1

(12) United States Patent
Harkins

(10) Patent No.: US 6,483,921 B1
(45) Date of Patent: *Nov. 19, 2002

(54) METHOD AND APPARATUS FOR REGENERATING SECRET KEYS IN
(54) bx;1DIFFIE-HELLMAN COMMUNICATION SESSIONS

(75) Inventor: Dan Harkins, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/692,677

(22) Filed: Oct. 18, 2000

Related U.S. Application Data

(63) Continuation of application No. 08/984,863, filed on Dec. 4, 1997, now Pat. No. 6,151,395.

(51) Int. Cl.$^7$ .............................. H04L 9/12; H04L 9/30

(52) U.S. Cl. ...................... 380/286; 380/30; 713/155; 713/181

(58) Field of Search ..................... 380/30, 281, 282, 380/286; 713/155, 156, 175, 176, 181

(56) References Cited

U.S. PATENT DOCUMENTS

| 4,776,011 A | | 10/1988 | Busby | 380/37 |
| 4,956,863 A | | 9/1990 | Goss | 380/30 |
| 5,436,972 A | * | 7/1995 | Fischer | 380/25 |
| 5,588,060 A | | 12/1996 | Aziz | 380/30 |
| 5,633,933 A | | 5/1997 | Aziz | 380/30 |
| 5,729,608 A | | 3/1998 | Janson et al. | 380/21 |
| 5,787,172 A | * | 7/1998 | Arnold | 380/21 |
| 5,850,451 A | | 12/1998 | Sudia | 380/49 |
| 5,889,865 A | | 3/1999 | Vanstone et al. | 380/25 |
| 5,920,630 A | | 7/1999 | Wertheimer et al. | 380/25 |

FOREIGN PATENT DOCUMENTS

DE      19514084 C1    4/1995  ............. H04L/9/00

OTHER PUBLICATIONS

Diffie et al., "New Directions in Cryptography," IEEE Transactions on Information Theory; vol. IT–22 No. 6, Nov. 1976, pp. 644–654.

Diffie, "The First Ten Years of Public–Key Cryptography", *Proceeding of the IEEE*, vol. 76, No. 5, May 1988, pp. 560–563.

Silvio Micali, Guaranteed Partial Key Escrow, MIT/LCS/TM–537, Laboratory for Computer Science, Massachusetts Institutes of Technology, Cambridge, MA (1995).

Mihir Bellare and Shafi Goldwasser, "Verifiable Partial Key Escrow," University of California, San Diego, CSE Department Technical Report.

"Escrowed Encryption Standard (ESS)," National Institute for Standards and Technology, Federal Information Processing Standards Publication (FIPS PUB) 185, Feb. 9, 1994.

(List continued on next page.)

*Primary Examiner*—Justin T. Darrow
(74) *Attorney, Agent, or Firm*—Hickman Palermo Truong & Becker LLP

(57) ABSTRACT

A system and method for regenerating secret keys that have been used to encrypt communications between two parties are disclosed. The system and method involve securely escrowing only one of the private values that the parties use in a Diffie-Hellman exchange to establish secure communications between the parties. The public value for each communication session is controlled after the escrow of the private value, and the secret keys are regenerated from the escrowed private value and the controlled public values. The escrowed private value is transmitted to the escrow center with full proof of security and authenticity, and the escrowed private value can be changed and re-sent to the escrow center.

20 Claims, 12 Drawing Sheets

OTHER PUBLICATIONS

Jim Omura, "Alternatives to RSA: Using Diffie–Hellman with DSS," White Paper, Cylink, Sep. 1995.

Zheng, Y. and Imai, H., "Compact and Unforgeable Key Establishment over an ATM Network,"in INFOCOM '98, 17$^{th}$ Conf. IEEE Computer and Communications Societies, Apr. 2, 1998, pp. 411–418.

H. Harney et al., "Group Key Management Protocol (GKMP) Specification," Jul. 1997, http://info.internet.isi.edu/in–notes/rfc2093.txt, pp. 1–18.

H. Harney et al., "Group Key Management Protocol (GKMP) Architecture," Jul. 1997, http://info.internet.isi.edu/in–notes/rfc/files/rfc2094.txt, pp. 1–17.

* cited by examiner

METHOD AND APPARATUS FOR REGENERATING SECRET KEYS IN DIFFIE-HELLMAN COMMUNICATION SESSIONS

RELATED APPLICATIONS

This application is a Continuation of Ser. No. 08/984,863, now U.S. Pat. No. 6,151,395 filed Dec. 4, 1997, and is filed pursuant to 37 C.F.R. §1.53(b).

FIELD THE INVENTION

This invention relates generally to cryptography and more particularly to a system and method for regenerating secret keys involved in Diffie-Hellman exchanges. Upon regeneration of secret keys, messages in secret communications are decrypted and observed.

BACKGROUND OF THE INVENTION

Cryptography involves the encoding and decoding of messages, and has utility in the field of secure communications where issues of privacy and authentication of messages in public communications are important concerns. A privacy system prevents the extraction by unauthorized parties ("eavesdroppers") of information from messages transmitted over a communication channel, thus assuring that only the intended recipient is able to read the message. An authentication system ensures detection of any modification of the message by unauthorized parties ("intermeddlers"), thus assuring the receiving party that the message is exactly what was sent by its sender. An authentication system also assures the recipient that the true sender actually sent the message. Depending upon safeguards, any communication channel may be threatened with eavesdropping or intermeddling, which thereby threatens the integrity of the messages or the identities of the transmitters.

FIG. 1 illustrates the flow of information in a conventional cryptographic communication. There are three parties: a transmitter 102, a receiver 104, and eavesdropper or intermeddlers 106. The transmitter 102 generates a message 108 to be communicated over a communication media 114 to the receiver 104. In order to prevent the eavesdropper or intermeddlers 106 from reading the messages, transmitter 102 encrypts the message 108 using an encryption key 110 producing encrypted message 112, which is sent to the receiver 104 over communications media 114. The legitimate receiver 104 must know how to decrypt the encrypted message 112 using decrypting key 116 to have access to the original message 108. The roles of transmitter 102 and receiver 104 are reversible, that is, a receiver 104 becomes a transmitter 102, which transmits encrypted messages 112 to the former transmitter 102, which in turn becomes receiver 104.

Encrypted messages in communication systems solve message security problems when message encryption techniques are properly used in the hands of legitimate personnel. However, in the hands of criminals or terrorists or other malicious parties, encrypted communications are an aid to illegal activities because the messages in the communications are secret to the public. The United States Government, motivated by a desire to prevent illegitimate activities, has required that it have access to encrypted communications so that it can observe the original, unencrypted messages 108. The government therefore has proposed various plans that require the parties involved in encrypted communications to hold in trust, or "escrow," the encryption keys 110 used to encrypt messages 108 for some period of time. These encryption keys 110 must be readily surrendered to the government upon request. Having acquired the encryption keys 110, the government then has access to the original message 108 through decryption of the encrypted message 112 which are exchanged between suspect parties.

The requirement to hold encryption keys for a long period of time has great impact on embedded communications devices, especially network routers, as most routers do not have any hard disk or other memory devices to store encryption keys.

Additionally, it is desirable to implement a cryptographic scheme utilizing ephemeral keys which are derived from a Diffie-Hellman exchange, with one key per communication session. These ephemeral keys are then destroyed after each session. Federal law mandates access to keys for a period of up to seven years, requiring storage of hundreds of thousands of keys since hundreds of thousands of communication sessions may occur in a period of seven years with each session generating a unique key.

Moreover, it is desirable to embrace a standard where any key escrow scheme does not preclude interoperability with existing standards. For example, if one party implements a key escrow scheme and others do not implement that key escrow scheme, it is desirable that the party with the escrow scheme is not precluded from inter-operating with the others.

It is further desirable that a key escrow scheme can be seamlessly added to any standard-compliant key management protocol which utilizes a Diffie-Hellman exchange in order to additionally generate ephemeral secret keys such that the additional implementation which performs escrow remains fully standard-compliant. The escrow requirement thus raises the concern that the escrow of keys must be done securely, i.e., with full proof of security and authentication of a party that is depositing a key in escrow.

Attempts at escrowing ephemeral keys have been discussed by Silvio Micali, "Guaranteed-Partial Key Escrow," MIT/LCS/TM-537, Laboratory for Computer Science, Massachusetts Institute of Technology, Cambridge, Mass. (1995); and by Mihir Bellare and Shafi Goldwasser, "Verifiable Partial Key Escrow," University of California, San Diego, CSE Department Technical Report. Both of these papers describe key escrow schemes that take advantage of a Diffie-Hellman exchange and allow for recovery of communications using a partially escrowed key. Each key used for bulk encryption by a router, for example, is partially escrowed. However, each of these schemes concerns only the partial escrow of a single ephemeral key, and does not deal with the problem of ephemeral session keys, where hundreds or thousands of keys are generated during a period of time of up to seven years.

A key escrow scheme applicable to network communications devices is discussed in "Escrowed Encryption Standard (ESS)," National Institute for Standards and Technology, Federal Information Processing Standards Publication (FIPS PUB) 185, 1994. However, this approach involves a hardware solution, and requires both parties in a communication to be active participants in the escrow operation.

Another key escrow scheme, also applicable to network communications devices, is disclosed by Jim Omura, "Alternatives to RSA Using Diffie-Hellman with DSS," White Paper, Cylink, September 1995. In this scheme, the escrowing party sends the key to an escrow agent, and the agent in return provides the escrowing party a public number to use in the next Diffie-Hellman exchange. However, this scheme involves the escrow of a single key and requires interaction with the escrow agent for each key.

In light of the above shortcomings of prior art techniques in encryption key escrowing, there is a need for an implementation that allows a complete recovery of all encryption keys involved in Diffie-Hellman exchanges and yet still prevents eavesdroppers and intermeddlers from capturing the secrets of private communications. In accordance with an embodiment, there are no special headers or messages required between parties for secure communications. Neither is there a special hardware requirement for any party involved in the communications.

There is also a need to provide a key-escrowing scheme that requires only a single interaction with the escrow agent during a time period of variable length and eliminates the needs to escrow each and every key, and where there is no necessity to store all of the session keys while preserving the ephemeral nature of these keys.

There is also a need to remove the requirement that a participating networking communication device maintain session keys after the life of the session has passed, and thereby to retain the ephemeral nature of the keys.

There is also a need to allow a party to take part in an escrow and to continue inter-operating with existing standards and methods of secured communications.

There is also a need to allow a solution that is applicable to all devices on a network, including hosts, servers and routers.

There is also a need to allow third party law enforcement officers to recover communication information and to monitor messages exchanged between the parties taking part in the Diffie-Hellman communications.

There is also a need to allow recovery of the communication even if only one party was involved in the escrowing scheme.

There is also a need to maintain the security strength of the Diffie-Hellman exchange.

There is also a need to escrow the key to the escrowing center with confidentiality and proof of ownership, thereby assuring both privacy and authenticity of the escrowed information.

SUMMARY OF THE INVENTION

The foregoing needs, and other needs that will become apparent from the following description and the appended claims, are fulfilled by the present invention, which comprises, in one aspect, a method of regenerating ephemeral secret keys for Diffie-Hellman communication sessions. A key regeneration method enables a third party "L" (such as a law enforcement officer) to gain access to communications previously exchanged between a party "A" and any other parties e.g. "B" or "C." Party A initially makes a private value Xa available to the third party L and, in one embodiment, party A escrows Xa to an escrow center, where the private value Xa is kept secret and made available only to third party L. Party A may then engage in any number of Diffie-Hellman exchanges with any remote parties in a plurality of communication sessions for a time period t.

For the first communication session between party A and another party B after the escrowing of private value Xa to the escrow center and prior to the conclusion of the period t, party A generates public value Ya from the equation:

$$Ya = g^{(Xa+n)} \bmod p,$$

where n equals a value such as 0, while party B generates public value Yb from the equation:

$$Yb = g^{Xb} \bmod p$$

The parties A and B provide their respective public values Ya and Yb to the other party, i.e., Ya to party B and Yb to party A. Both parties A and B then generate, respectively, a secret key Kab and Kba for their secret communication session, where:

$$Kab = Yb^{Xa} \bmod p$$
$$= Kba = Ya^{Xb} \bmod p = K,$$

such that K is a common secret key for both parties. For each of the successive communication sessions, whether to party B or to any other party C, for example, party A generates public value Ya from the same equation $Ya = g^{(Xa+n)} \bmod p$, where n is a new value. The new value n may be created, for example, by increasing a previous value of n by 1. Party C generates public value Yc from the equation $Yc = g^{Xc} \bmod p$, where Xc is a random value of sufficient entropy to guarantee the strength of the secret value K.

When the third party L desires to gain access to communications between the party A and any other party B or C, third party L needs to regenerate the secret key Kab involved in the communication between party A and party B. Party L then obtains Xa from the escrow center and public values Ya and Yb associated with the communication session that party L desires to gain access to. For example, party L eavesdrops directly on the exchange which was done without encryption. In one method, party L calculates secret key Kab using the equation $Kab = Yb^{(Xa+n)} \bmod p$. Party L selects a value for n, such as 0 or some other value. Party L calculates Kab and tries to access the desired communication session. If unsuccessful, party L then changes n, for example, by incrementing n by one from the previous value of n. Party L then recalculates Kab until party L is successful in acquiring Kab.

In another aspect, party L calculates secret key Kab using the same equation $Kab = Yb^{(Xa+n)} \bmod p$, but by first obtaining n from the equation $Y = g^{(Xa+n)} \bmod p$. In one embodiment, party L sets n equal 0, calculates Y, then compares Y to Ya. If Y does not equal to Ya, party L changes n, for example, by incrementing n by one from a previous value of n. Party L then recalculates Y until Y equals Ya. When Y equals Ya, party L has acquired the value for n, and then calculates $Kab = Yb^{(Xa+n)} \bmod p$ with the acquired n and the previously known values of Yb and Xa.

After time period t has elapsed, a new value Xa is derived and escrowed with the escrow agent. Time period t can be based on the time between escrows or a value v such that a re-escrow is performed when n=v.

DETAILED DESCRIPTION OF THE PREFERRED EMBODIMENT

A method for regenerating encryption keys involved in Diffie-Hellman exchanges in computer network communications is disclosed.

Diffie-Hellman Key Exchange

Diffie-Hellman exchange is also known as the exponential key exchange since it uses modular exponentiation, where a number, the generator, is raised by a certain exponent, the private number, modulus a large prime number, the prime, to create another large value, the public number. The public number is exchanged between the two participants according to the equation:

$$Y = g^X \bmod p,$$

where Y is the public number, X is the private number, g is the generator, and p is the prime.

Figure 1:
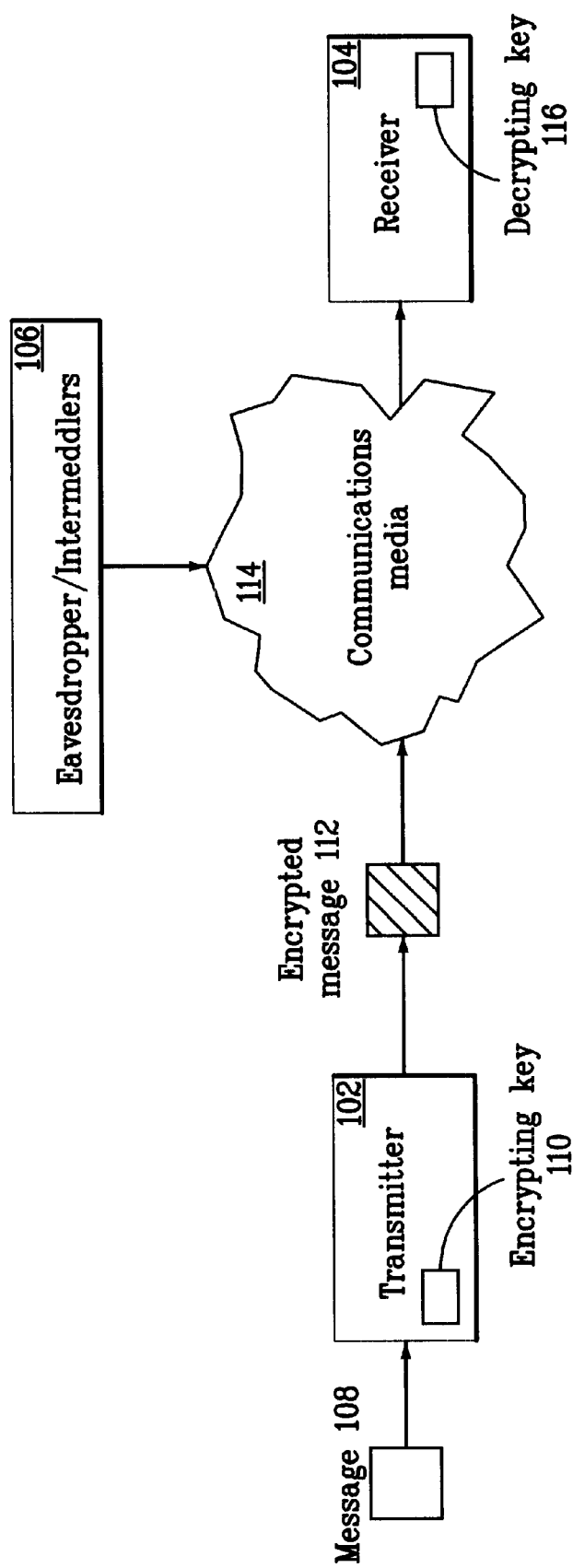
FIG. 1 is a block diagram showing a flow of information in a conventional cryptographic system.
Figure 2A:
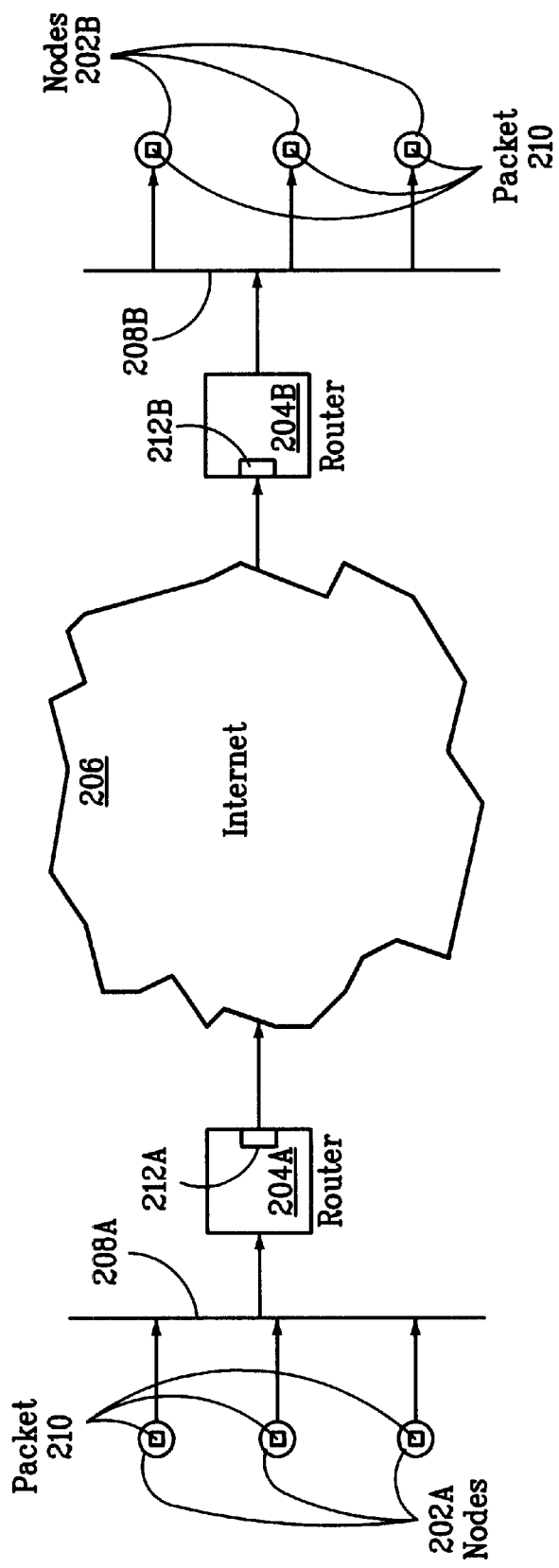
FIG. 2A illustrates an example of a computer network communication system using routers.

Referring now to FIG. 2A, there is shown an example of a computer network communication system using routers. Hosts 202A are connected via a network 208A to router 204A and similarly hosts 202B are connected via a network 208B to router 204B. Party A transmits and receives messages through router 204A and host 202A, while party B transmits and receives messages through router 204B and host 202B. Routers 204 are network communication devices which connect networks and route packets 210. Each router 204 may have multiple interfaces 212.

When a packet 210 arrives at one interface 212, the router 204 inspects the packet 210 to determine where the packet 210 is destined to go, and then determines which of its other interfaces 212 is the appropriate one to send the packet 210. In this manner, a packet 210 goes from router to router along a path from source to destination. A host 202 is generally, but not necessarily, a computer on a network, and is a communications endpoint.

Figure 2B:
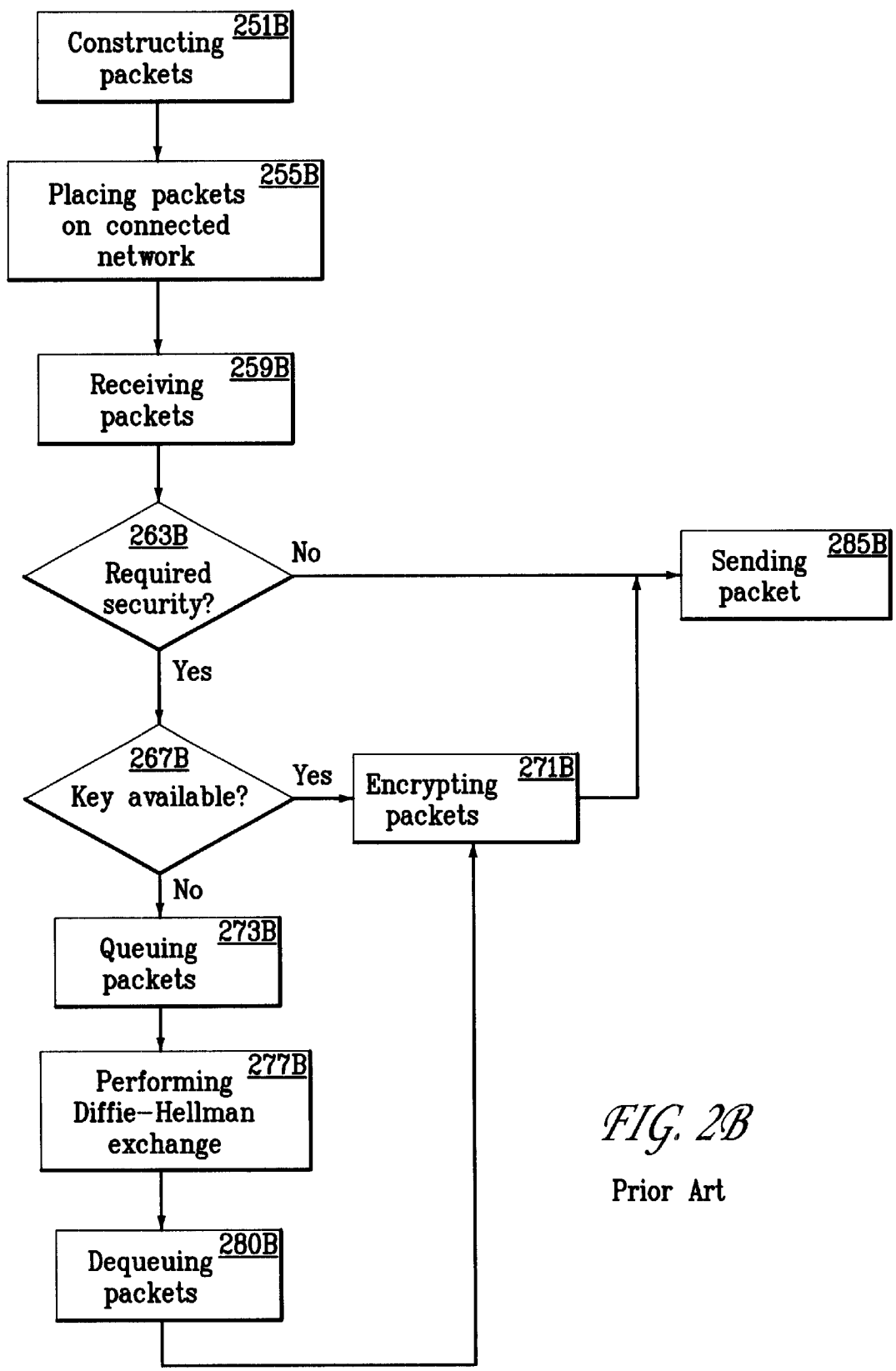
FIG. 2B illustrates how a packet is sent from one source to destination through an intermediate communication device which provides security.

FIG. 2B illustrates how a packet 210 is sent from a source to a destination. At step 251B, host 202A constructs messages in the form of packets 210 and at step 255B places these packets 210 on its interface 212A. At step 259B, router 204A receives packets 210. At step 263B, router 204A determines whether the communication requires security; if it does, router 204A, at step 267B, determines if an encryption key exists in router 204A's memory. If an encryption keys exists, router 204A encrypts the packet 210 at step 271B. This encryption can be performed either in hardware or software. If, at step 267B, router 204A found no key in memory, router 204A then queues the packet 210 at step 273B, and at step 277B, router 204A initiates a Diffie-Hellman exchange. Upon completion of the Diffie-Hellman exchange and establishment of a shared secret router 204A, at step 280B, de-queues all queued packets 210 and encrypts them at step 271B. At step 285B, router 204A sends the packet 210 (whether encrypted or not) to an appropriate destination, which could be another router 204B or a host 202B, for example.

The Diffie-Hellman exchange in computer network communications takes advantage of the ease with which exponentials can be computed in a Galois finite field GF(p), with a prime number p of elements under arithmetic modulo p, as compared with the difficulty of computing logarithms in the same field. Number p of elements includes 0, 1, 2, ... p−1 elements. If $$Y = g_X \bmod p, \text{ for } 1 < X < p-1$$

where g is a fixed primitive element of GF(p) and the powers of g produce all the nonzero elements 1, 2, ..., p−1 of GF(p), then X is referred to as the logarithm of Y to the base g, over GF(p):

$$X = \log_g Y \text{ over } GF(p), \text{ for } 1 < Y < p-1$$

Calculation of Y from X is straightforward. Using repeated squaring, it takes at most $2^{\log(\text{base } 2)}p$ multiplications. For example, $$g^{37} = g^{(32+4+1)}$$
$$= ((((g^{}2)^{}2)^{}2)^{}2)^{}2 \times (g^{}2)^{**}2 \times g$$

Computing X from Y, on the other hand, is typically far more difficult. If p has been chosen correctly, extracting logarithms modulo p requires on the order of $p^{1/2}$ operations. The security of the Diffie-Hellman encryption technique depends on the difficulty of computing logarithms mod p, and the system can be broken if an algorithm whose complexity grows as $\log_2 p$ were to be found. X and Y in the Diffie-Hellman technique are referred to as the "private value" and "public value," respectively. See Diffie, et al., "New Directions in Cryptography," IEEE Transactions on Information Theory; vol. IT-22, No. 6, November 1976, page 649; and Diffie, "The First Ten Years of Public-Key Cryptography," Proceedings of the IEEE, vol. 76, No. 5, May 1988, page 562–563.

Figure 3A:
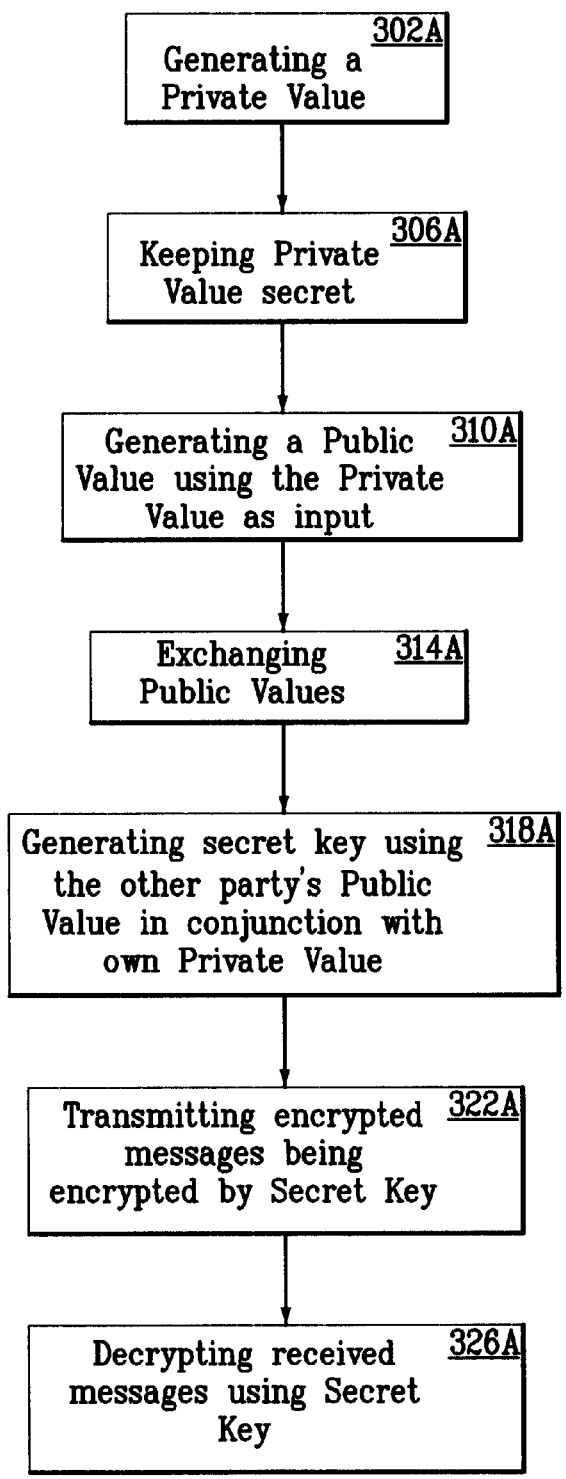
FIG. 3A shows steps involved in a Diffie-Hellman exchange between two parties, and use of the secret with a symmetric cipher.

FIG. 3A shows the steps involved in a Diffie-Hellman exchange between two parties. At step 302A, each of the two parties generates its own private value X, and keeps this private value X secret to itself, in step 306A. At step 310A, each party generates a public value Y, using its own private value X as an input. Each party then provides its own public value Y to the other party in step 314A. In one embodiment, each party at step 318A exchanges its public value Y. Upon receiving the public value Y from the other party, each party generates a secret value K using the other party's public value Y in conjunction with its own private value X. Even though each of the two parties independently generates two secret values K, the two values K are the same, i.e., they possess the same values, according to the Diffie-Hellman exchange characteristic, to be explained further in detail in accordance with FIG. 3B and FIG. 3C. At step 322A, each party uses the secret value K to encrypt and transmit messages, and to communicate the encrypted messages to the other party. Similarly, at step 326A, each party uses the secret value K to decrypt the encrypted messages received from the other party.

Figure 3B:
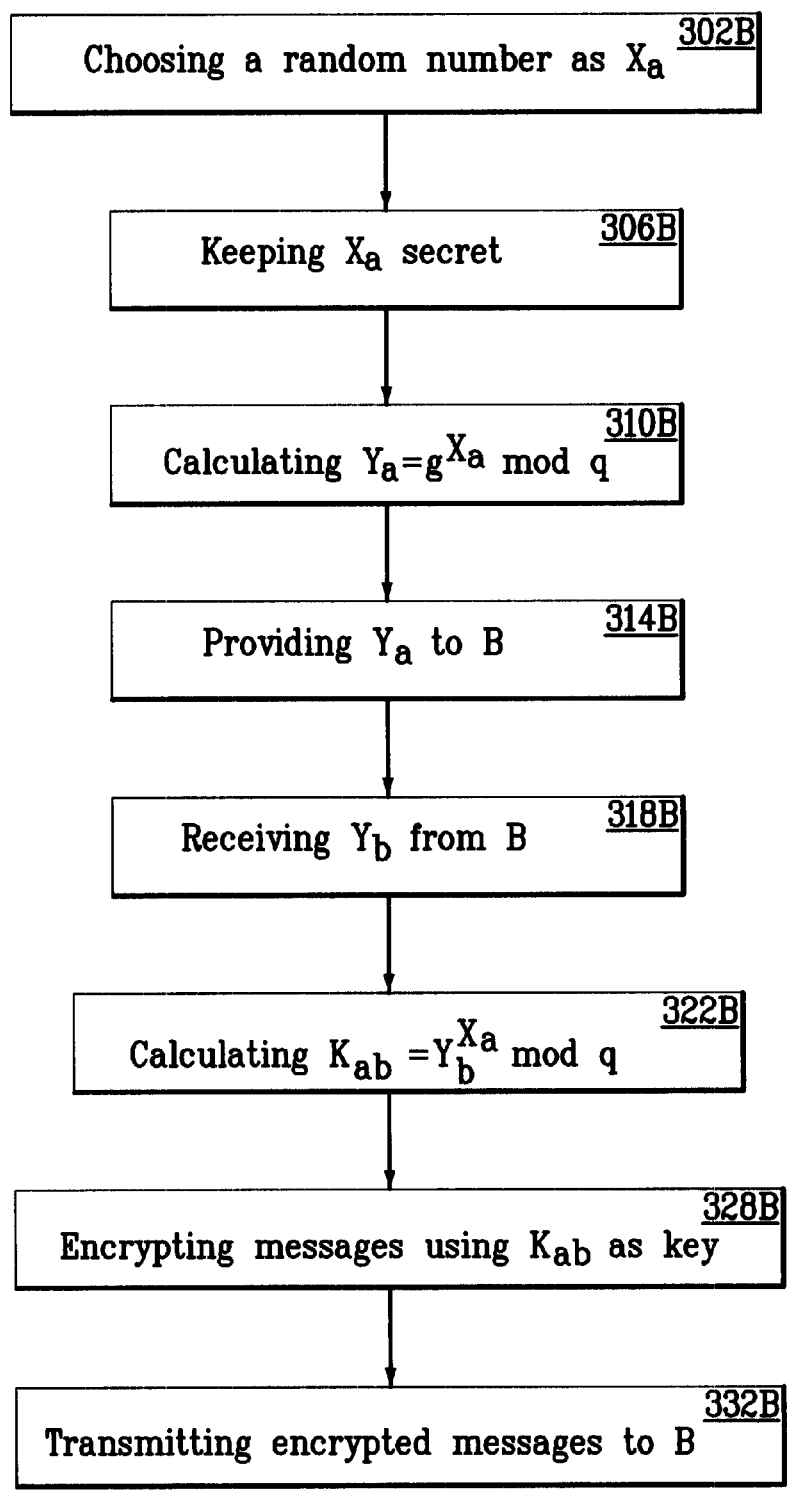
FIG. 3B illustrates steps where a party A transmits its messages to a party B.
Figure 3C:
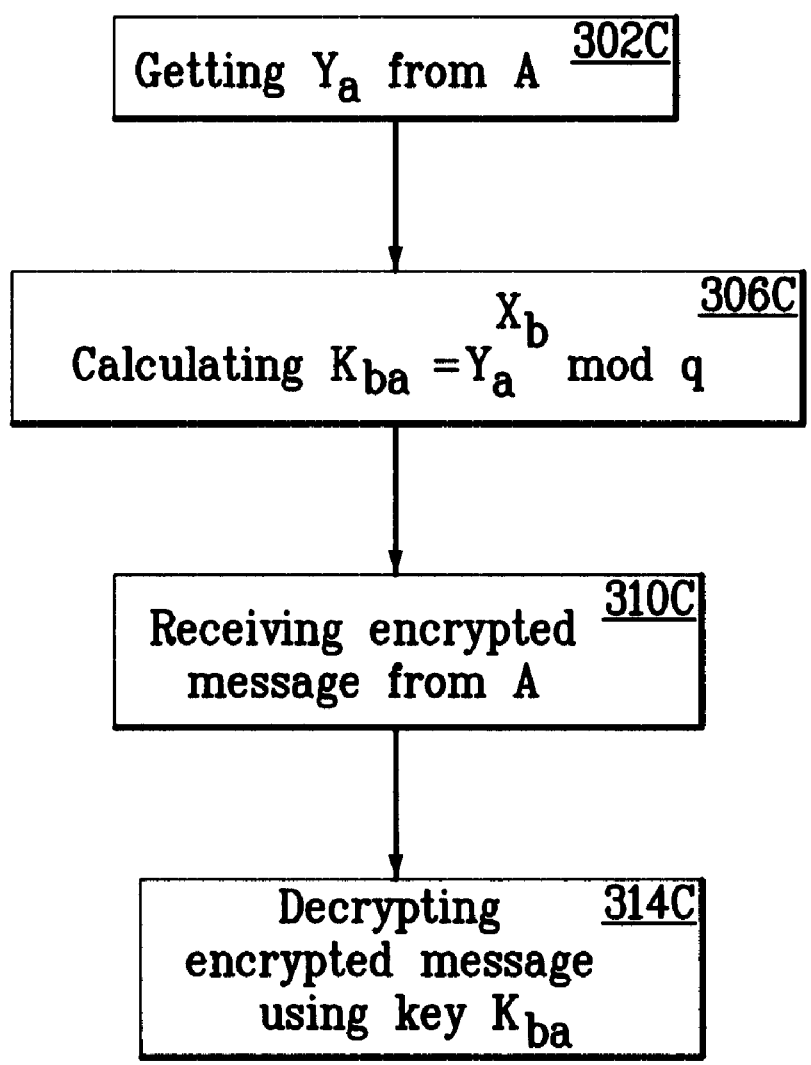
FIG. 3C illustrates steps where a party B receives the messages transmitted from a party A.

Using as an example two parties A and B exchanging information using the Diffie-Hellman encryption technique, FIG. 3B shows the steps a party A uses to send its messages to a party B, while FIG. 3C shows the steps the party B uses to receive its messages from the party A. Referring first to step 302B in FIG. 3B, party A generates its private value Xa.

In one embodiment, Xa is an independent random number chosen uniformly from the set of integers 1, 2, ..., p−1, where p is a prime number as explained above. In step 306B, party A keeps Xa secret. In step 310B, party A then generates its public value Ya, where $$Ya = g^{Xa} \bmod p$$

For example, if g=2, and p=$2^{1024}-2^{960}-1+2^{64}*\{[2^{894\pi}]+129093\}$, or in hexadecimal=FFFFFFFF FFFFFFFF C90FDAA2 2168C234 C4C6628B 80DC1CD1 29024E08 8A67CC74 020BBEA6 3B139B22 514A0879 8E3404DD EF9519B3 CD3A431B 302B0A6D F25F1437 4FE1356D 6D51C245 E485B576 625E7EC6 F44C42E9 A637ED6B 0BFF5CB6 F406B7ED EE386BFB 5A899FA5 AE9F2411 7C4B1FE6 49286651 ECE65381 FFFFFFFF FFFFFFFF, then Xa, in hexadecimal, might be 1497A673C719301D837645AA09836F30475D859F708 4967BF64829582A628475C63. Party A then provides Ya to party B, e.g., by transmitting Ya to party B, or by placing Ya in the public domain where party B can gain access to Ya in an authenticated manner. At this point, even though Ya, g, and p may all be publicly known, Xa is still secret because calculating Xa from the equation Ya=$g^{Xa}$ mod p is very difficult. Furthermore, at this step, presumably party B has performed steps identical to steps 302B, 306B, 310B, 314B of party A, so that the public value Yb of party B has been made available to party A. At step 318B, party A then receives Yb. At step 322B, party A, having its own private value Xa, and public value Yb from party B, then calculates Kab, where $$Kab = Yb^{Xa} \bmod p$$

Since Yb=$g^{Xb}$, $$Kab = \left((g^{Xb})^{Xa}\right) \bmod p \quad (1)$$
$$= g^{XbXa} \bmod p$$

Similarly, at party B's side, party B has calculated Kba, where $$Kba = Ya^{Xb} \bmod p,$$

and since Ya=$g^{Xa}$ $$Kba = \left((g^{Xa})^{Xb}\right) \bmod p \quad (2)$$
$$= g^{XaXb} \bmod p$$

From equations (1) and (2)

$$K = Kab = Kba$$

where K is the secret key that is only known and shared between party A and party B. No one else except either party A or B can calculate K since no one except A and B knows either private value Xa or private value Xb. Additionally, the fact that the prime p and generator g are public knowledge does not lessen the security of the exchange because private values Xa and Xb remain secret and only known to A and B, respectively. At step 328B, party A then uses K, which is the same as Kab and Kba, to encrypt the original messages, and sends the encrypted message to party B at step 332B.

FIG. 3C illustrates how party B receives the encrypted message from party A. At step 302C, party B acquires public value Ya that has been provided by party A at step 314B in FIG. 3B. With the acquired public value Ya and its own private value Xb, party B calculates Kab at step 306C, where $$Kba = Ya^{Xb} \bmod p$$

At step 310C, party B receives the encrypted message from party A, and at step 314C, party B uses Kab to decrypt the encrypted message received from party A.

In accordance with an embodiment, a party uses the Diffie-Hellman exchange technique for communication with other parties, but the private value X is escrowed to an escrow center, and the generation of the public value Y in each one of the communication sessions is controlled after the private value X is escrowed. This scheme allows each secret key K involved in each communication session to be regenerated with the escrowed private value and the controlled public value serving as regenerating inputs. The intended party, the United States Government, for example, which is sanctioned by law to recover secret communications, can use the regenerated keys K to gain access to the desired secret communication sessions.

Since the private value X must remain secret, the escrowing of private value X to the escrow center must be done securely without intermeddling by any unintended party. Escrowing must also be done in an authenticated and confidential manner. This is accomplished by public key techniques employed by both the escrow center and the escrowing party A. In one embodiment, party A must have an authenticated public key used for digital signature verification, and the escrowing center must have an authenticated public key from an algorithm which supports public key encryption, e.g. RSA or El-Gamal.

Figure 4A:
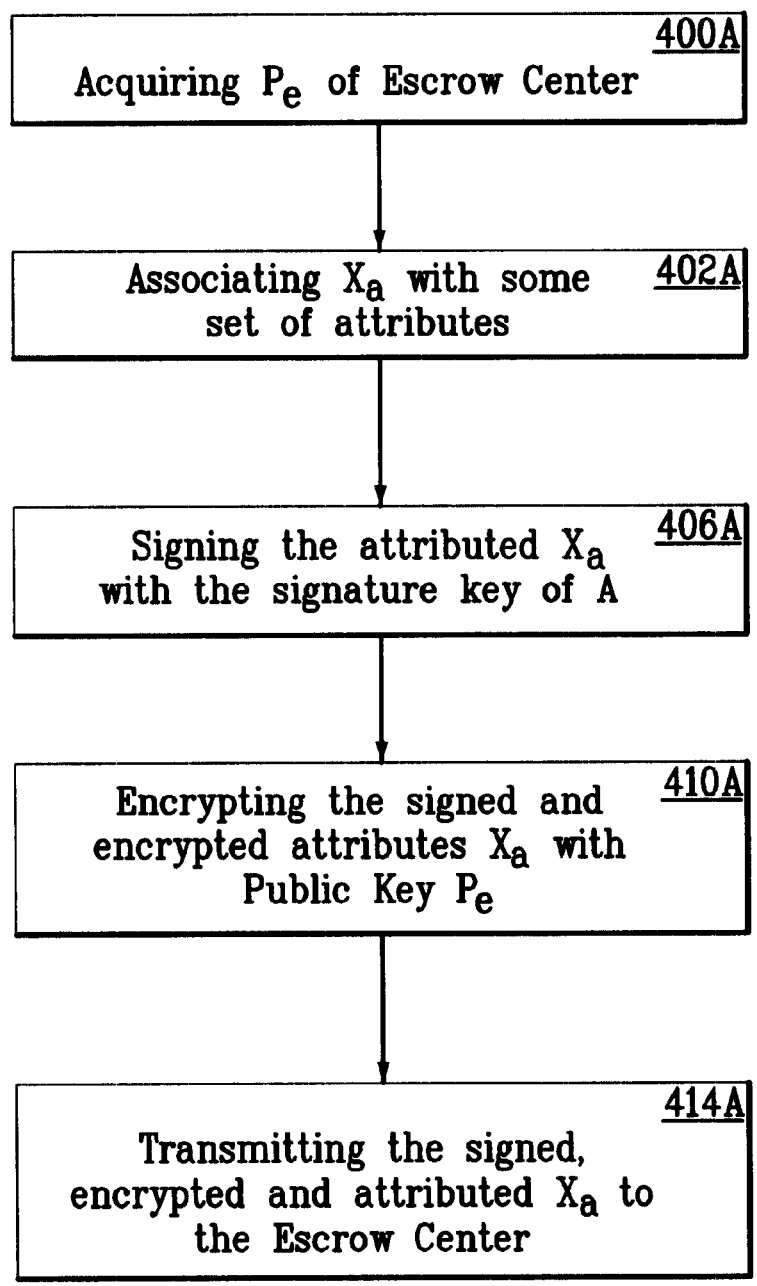
FIG. 4A shows steps where a party A escrows private value Xa to an escrow center.

FIG. 4A is a flow diagram showing a process in which party A is escrowing private value Xa to the escrow center. At step 400A, party A acquires a public key Pe from the escrow center in an authenticated manner. At step 402A, party A associates Xa with a set of unique attributes, such as party A's name, address and date of birth, etc., for identification purposes. At step 406A, party A signs the attributed Xa. In one embodiment, Party A signs by using a digital signature approach that uses a public and private key. The private key is secret while the public key is widely advertised.

To sign a document, the document is hashed to produce a standard-sized target, which is then transformed using the private key. The document can only produce that target hash. Any change, even as minor as adding a single space or turning a period to a comma, will drastically change the target hash. To verify the signature, an inverse transformation is applied to prove that the signature could only be the result of the original transformation applied to the hash. For example, with signatures using RSA the sign is an encrypt transformation while the verify is a decrypt transformation.

At step 410A, party A encrypts the signed Xa using Pe and, at step 414A, party A transmits the signed and encrypted Xa to the escrow center.

Figure 4B:
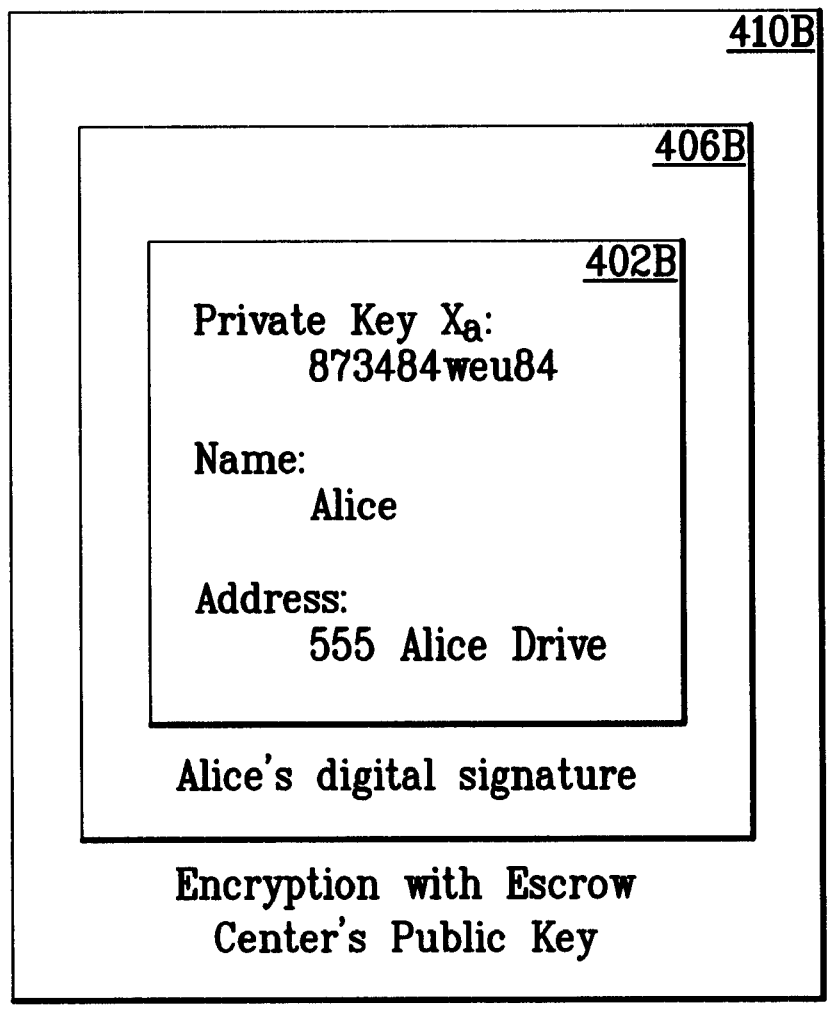
FIG. 4B illustrates a signed and encrypted private value Xa.

FIG. 4B illustrates a signed and encrypted Xa, where 402B represents private value Xa with the attributes of party A, 406B represents Xa with attributes that have been digitally signed, and 410B represents the attributed, signed and encrypted Xa.

Figure 4C:
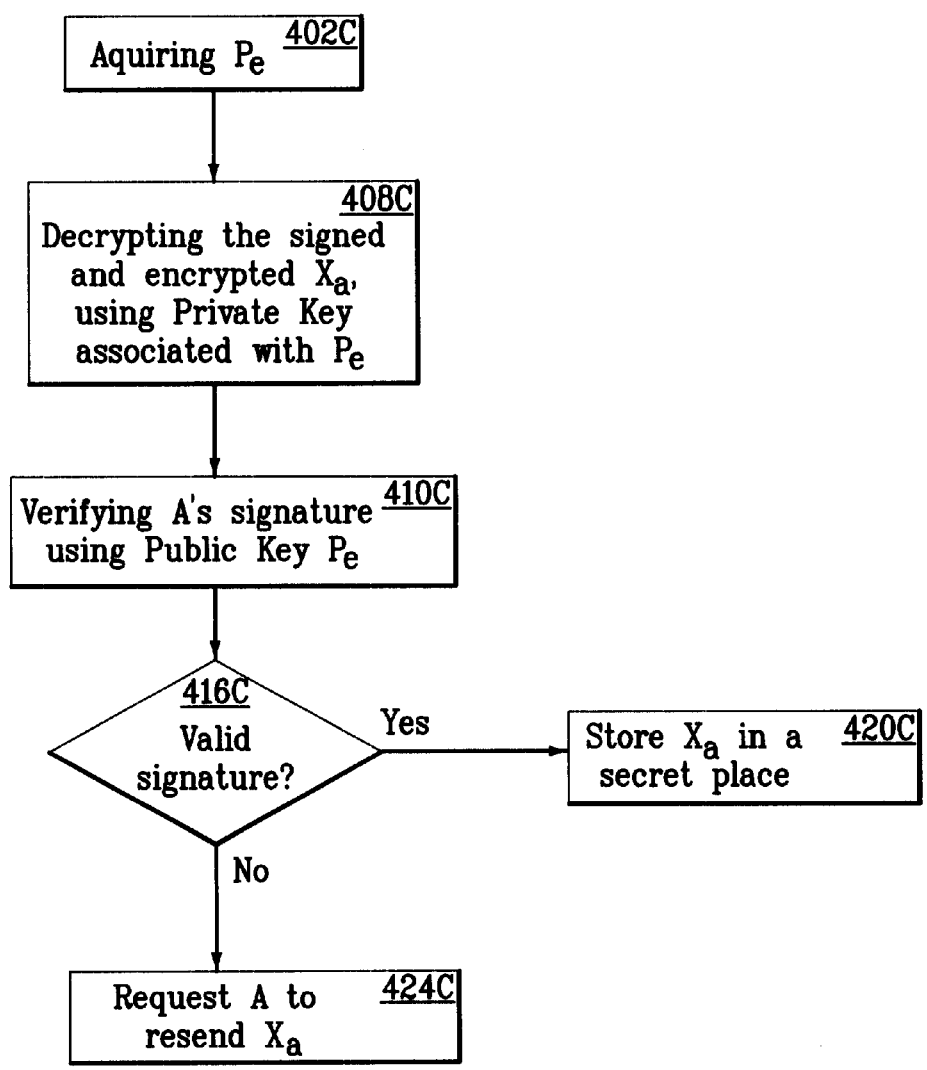
FIG. 4C shows how an escrow center receives the encrypted and signed private value Xa.

FIG. 4C shows a flow chart of the escrow center receiving the encrypted and signed Xa. At step 402C, the escrow center uses the private key associated with Pe and at step 408C, the escrow center decrypts the signed and encrypted message received from party A. At step 410C, the escrow center verifies the signature of party A using the authenticated public key of party A used for signature verification.

At step 416C, the escrow center determines whether the signature is valid. If the signature is valid, then at step 420C the escrow center stores Xa in a secret place. If the signature is not valid then the escrow center requests party A to resend Xa, at step 424C.

Having escrowed the private value Xa in the escrow center, party A generates the public value Ya for each one of the subsequent communication sessions to other parties using the equation:

$$Ya = g^{(Xa+n)} \bmod p$$

where n differs for each of the sessions. In one embodiment, n equals 0 for the first communication session after private value Xa is escrowed, and n is incremented by one for each successive session. For example, party A's successive public values Ya0, Ya1, Ya2, ... Yan for sessions 0, 1, 2, ... n, after private value Xa is escrowed, are as follows:

$$Ya0 = g^{(Xa+0)} = g^{Xa} \bmod p$$

$$Ya1 = g^{(Xa+1)} \bmod p$$

$$Yan = g^{(Xa+n)} \bmod p$$

Figure 5:
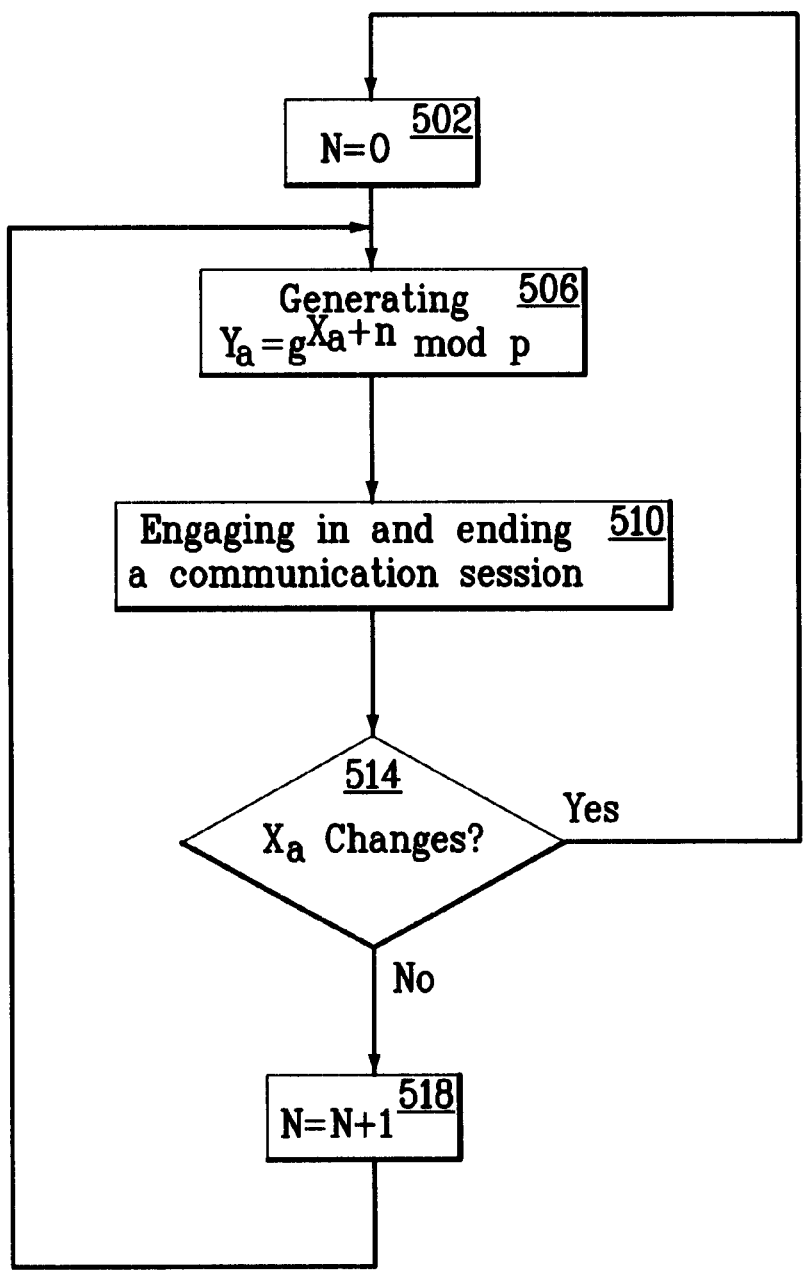
FIG. 5 illustrates how a party A generates public values Ya for each communication session after Xa has been escrowed.

FIG. 5 shows a flow chart of an embodiment of a process in which party A generates public values for each communication session after private value Xa is escrowed to the escrow center. At step 502, party A initializes n, e.g., to zero. At step 506, party A generates $Ya = g^{Xa+n} \bmod p$. At step 510, party A engages in communication exchange and subsequently ends the communication.

At step 514, party A determines whether a new private value Xa needs to be escrowed. If a new escrow of Xa is not required, at step 518 party A changes n, e.g., by incrementing n by 1, i.e., n=n+1. Party A then returns to step 506 for each one of the successive communication sessions. If Xa is required to be changed, then at step 502 party A resets n, and starts a new set of communication sessions, as indicated by step 506.

Figure 6A:
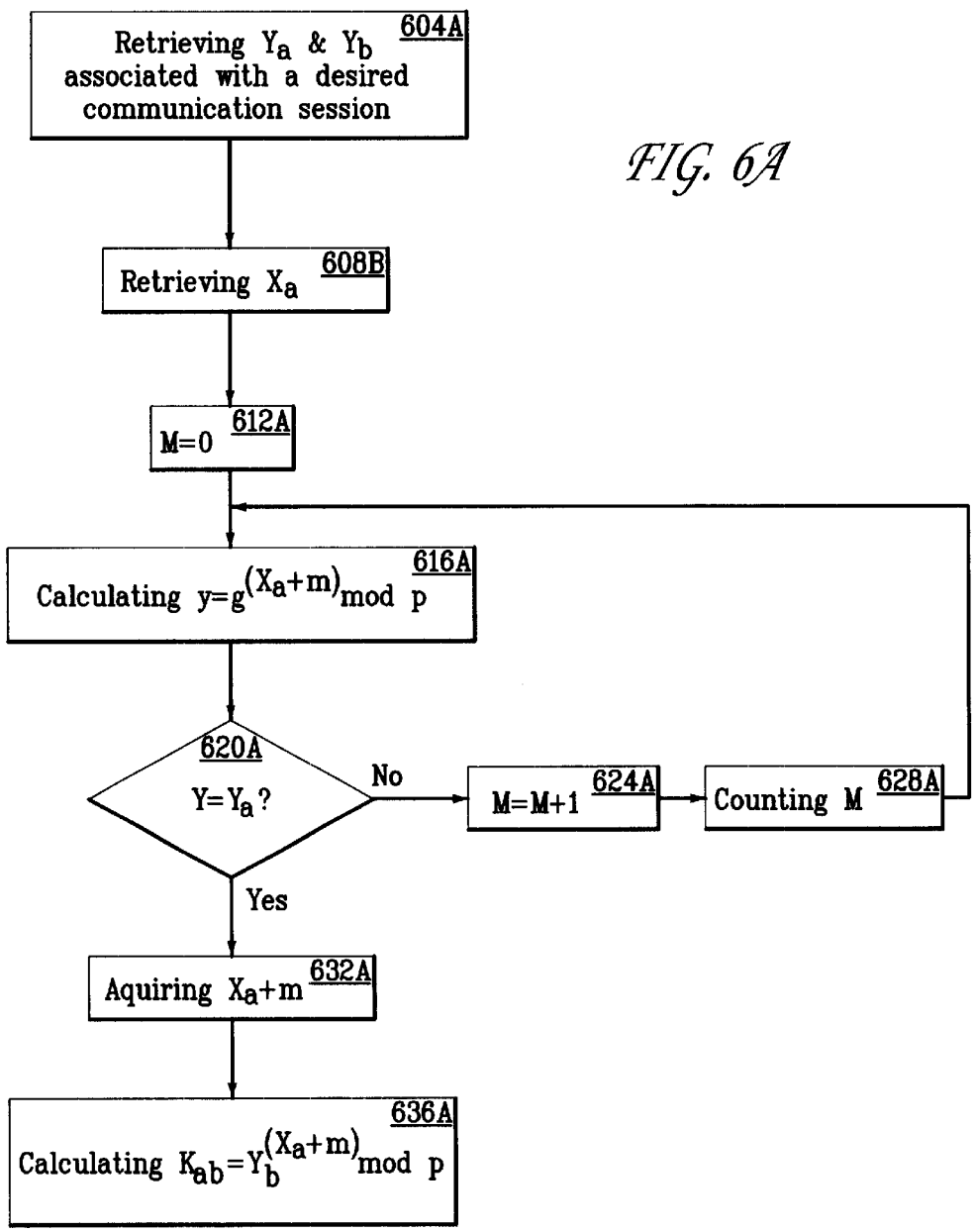
FIG. 6A illustrates a first method showing how a law enforcement officer regenerates a secret key.
Figure 6B:
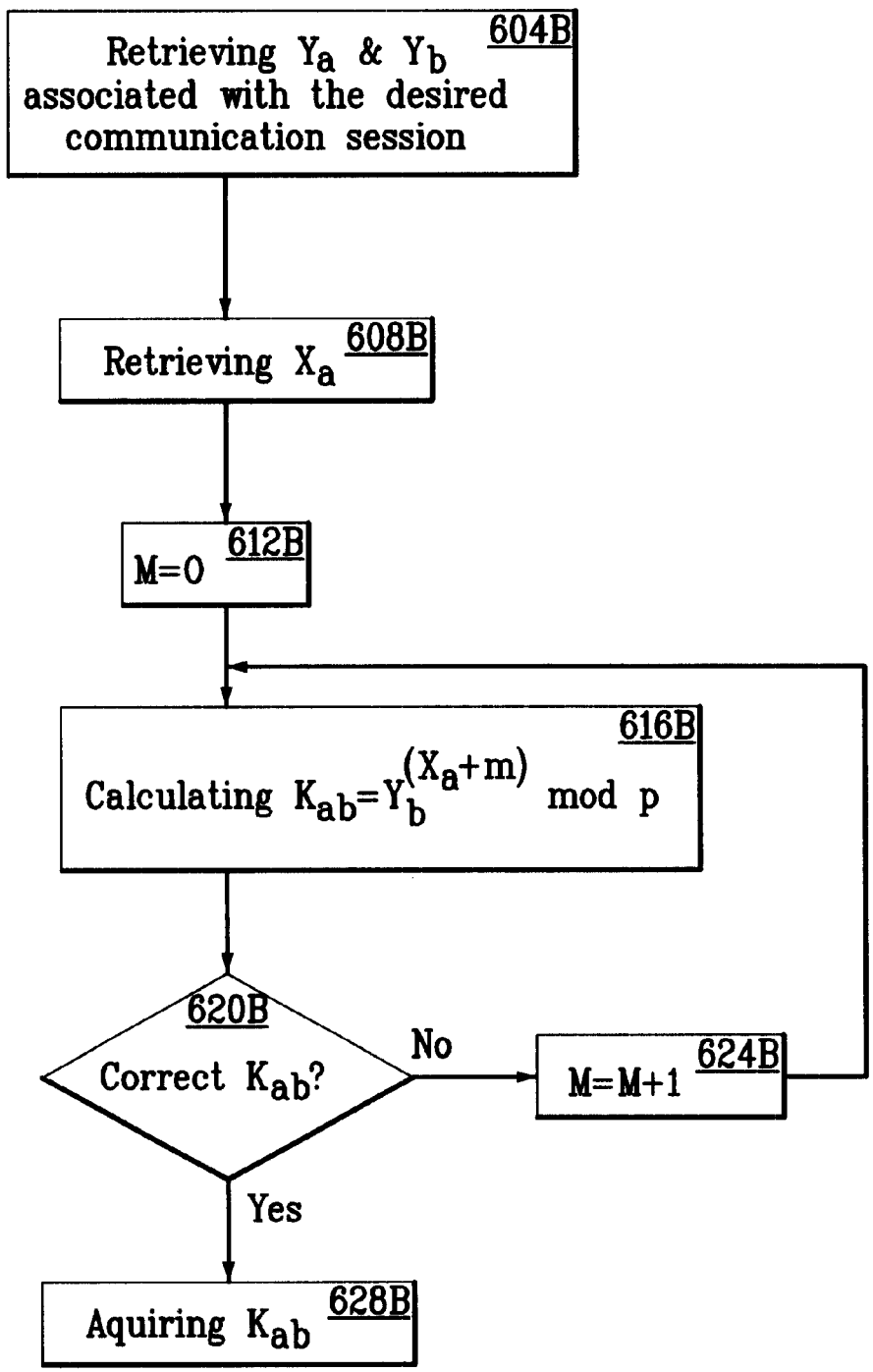
FIG. 6B illustrates a second method showing how a law enforcement officer regenerates a secret key.

FIG. 6A and FIG. 6B show two examples of methods where a party L, generally a law enforcement officer, regenerates secret keys Kab involved in a communication between escrowing party A and another party B.

FIG. 6A illustrates a first method of re-generating secret key Kab.

At step 604A, law enforcement officer (LEO) retrieves public values Ya and Yb associated with a communication session that LEO desires to observe. At step 608A, LEO also retrieves private value Xa from the escrow center. At step 612A, LEO sets m to zero, and at step 616A, LEO calculates Y with the equation:

$$Y = g^{(Xa+m)} \bmod p$$

At step 620A, LEO compares Y and Ya. If Y does not equal Ya, then LEO has not yet successfully acquired the public value Ya for the desired communication, and at step 624A, LEO then changes m, e.g., by incrementing m by one, and then recalculates Y at step 616A until Y equals Ya at step 620A. LEO performs this incrementing, recalculation, and comparison m times by counting the successive iterations, as shown by step 628A. When Y equals Ya, LEO has acquired the correct private value Xa+m for the desired communication session. LEO then calculates secret key Kab at step 636A, where $$Kab = Yb^{(Xa+m)} \bmod p$$

FIG. 6B illustrates a second method whereby LEO regenerates a secret key Kab.

Steps 604B, 608B, and 612B are respectively identical to steps 604A, 608A, and 612A in FIG. 6A, where LEO retrieves Ya, Yb, and Xa, and initializes m. At step 616B, LEO calculates secret key Kab, where $$Kab = Yb^{(Xa+r)} \bmod p.$$

At step 620B, LEO determines whether the correct secret key Kab has been found by attempting to decrypt the messages involved in the communication session. If LEO cannot decrypt the messages, he has not acquired the correct secret key Kab. LEO then selects a different value for m, for example, by incrementing m by one, as indicated by step 624B. LEO then recalculates Kab in step 616B until he has successfully acquired Kab at step 628B.

Having acquired secret key Kab by either of the two methods described in FIGS. 6A and 6B, LEO then may decrypt and inspect the encrypted messages involved in the desired communication session.

The invention has been explained above with reference to one or more preferred embodiments. Other embodiments will be apparent to those skilled in the art after reading this disclosure. For example, the present invention may be readily implemented in system configurations other than those utilizing routers as described in the preferred embodiment above. Any communications employing the Diffie-Hellman exchange can utilize the present invention. Additionally, the present invention may effectively be used in combination with networking systems other than that described above in accordance with the preferred embodiment. Therefore, these and other variations upon the preferred embodiments are intended to be covered by the present invention, which is limited only by the following claims.

What is claimed is:

1. A method of regenerating, for use by a third party, a secret key used in a Diffie-Hellman communication session involving a first party and one or more second parties, comprising the computer-implemented steps of:
   at the third party
      receiving a private value of the first party;
      generating one or more public values of the first party using a number n in a first modular exponentiation equation {public value=$g^{(Xi+n)}$mod p}, wherein the number n differs for each of a plurality of communication sessions, Xi represents a private value of the first party, g represents a generator number, and p represents a prime number, and wherein each of the public values is associated with one public value of the second party for each of the communication sessions; and
      determining for the third party a number m associated with the number n to regenerate the secret key using a second modular exponentiation equation.

2. A method as recited in claim 1, wherein the step of receiving a private value of the first party comprises the step of receiving a private value of the first party from an escrow agent with whom the first party previously has escrowed the private value in an authenticated manner.

3. A method as recited in claim 1, further comprising the steps of:
   assigning a value of zero to the number n;
   carrying out the steps recited in claim 1 for a first communication session among a plurality of communication sessions;
   successively incrementing the number n by one, and carrying out the steps recited in claim 1, for a plurality of subsequent communication sessions.

4. A method as recited in claim 1, wherein the step of determining for the third party a number m associated with the number n to regenerate the secret key in a second modular exponentiation equation comprises the steps of:

receiving a public value Yis and a public value Yjs that are associated with the communication session;

selecting a value for the number m;

creating and storing a value $Y = g^{(Xi+m)} \mod p$;

when Y is not equal to the public value Yis, selecting a different value for the number m and repeating the step of creating and storing the value Y;

creating and storing the secret key by determining a value $Yjs^{(Xi+m)} \mod p$.

5. A method as recited in claim 4, wherein the step of creating and storing a value Y further comprises the step of incrementing the value m by one.

6. A method as recited in claim 1, wherein the step of determining a number m to regenerate the secret key comprises the steps of:

receiving a public value Yjs associated with the communication session;

selecting a value for the number m;

creating and storing the secret key by determining a value $Yjs^{(Xi+m)} \mod p$; and if the secret key is unacceptable, then selecting a different value for the number m and repeating the step of creating and storing the secret key;

if the secret key is acceptable, then using the secret key to decrypt the communication session.

7. A method as recited in claim 6, wherein the step of selecting a value for the number m comprises the step of assigning a value of zero to the number m, and wherein the step of selecting a different value for the number m comprises the step of incrementing the number m by one.

8. A method as recited in claim 1, wherein the step of receiving a private value of the first party comprises the steps of receiving a private value of the first party that has been previously escrowed with a fourth party by the steps of creating and storing a digital certificate for the private value based on adding identification information to the private value; encrypting the digital certificate; digitally signing the digital certificate; and sending the digital certificate to the fourth party.

9. A method of regenerating, for use by a third party, a secret key used in a Diffie-Hellman communication session involving a first party and one or more second parties, comprising the computer-implemented steps of:

at the third party receiving a public key from the escrow center;

associating, with the private value, one or more attributes that uniquely identify the first party, to result in creating and storing an attributed private value;

encrypting the attributed private value using the public key of the escrow center;

transmitting the encrypted attributed private value to the escrow center;

generating one or more public values of the first party using a number n in a first modular exponentiation equation {public value=$g^{(Xi+n)} \mod p$}, wherein the number n differs for each of a plurality of communication sessions, Xi represents a private value of the first party, g represents a generator number, and p represents a prime number, and wherein each of the public values is associated with one public value of the second party for each of the communication sessions; and determining for the third party a number m associated with the number n to regenerate the secret key using a second modular exponentiation equation.

10. A method as recited in claim 1, wherein the step of determining for the third party a number m associated with the number n to regenerate the secret key in a second modular exponentiation equation comprises the steps of:

receiving a first public value and a second public value that are associated with the parties to the communication session;

using the first public value and the second public value to determine the number n; and calculating the secret key value as $Yjs^{(Xi+n)} \mod p$, wherein Yjs represents the second public value.

11. A computer-readable medium carrying one or more sequences of instructions for regenerating, for use by a third party, a secret key used in a Diffie-Hellman communication session involving a first party and one or more second parties, which instructions, when executed by one or more processors, cause the one or more processors to carry out the computer-implemented steps of:

at the third party receiving a private value of the first party;

generating one or more public values of the first party using a number n in a first modular exponentiation equation {public value=$g^{(Xi+n)} \mod p$}, wherein the number n differs for each of the communication sessions, Xi represents a private value of the first party, g represents a generator number, and p represents a prime number, and wherein each of the public values is associated with one public value of the second party for each of the communication sessions; and determining for the third party a number m associated with the number n to regenerate the secret key in a second modular exponentiation equation.

12. An apparatus for regenerating, for use by a third party, a secret key used in a Diffie-Hellman communication session involving a first party and one or more second parties, comprising:

means at the third party for receiving a private value of the first party;

means for generating one or more public values of the first party using a number n in a first modular exponentiation equation {public value=$g^{(Xi+n)} \mod p$}, wherein the number n differs for each of the communication sessions, Xi represents a private value of the first party, g represents a generator number, and p represents a prime number, and wherein each of the public values is associated with one public value of the second party for each of the communication sessions; and means for determining for the third party a number m associated with the number n to regenerate the secret key in a second modular exponentiation equation.

13. An apparatus for regenerating, for use by a third party, a secret key used in a Diffie-Hellman communication session involving a first party and one or more second parties over a network, comprising:

a data processor;

a network interface that is communicatively coupled to the data processor and communicatively coupled to the network for receiving a plurality of packets therefrom which packets are associated with the communication session; and a memory comprising one or more stored sequences of instructions which, when executed by the processor, cause the processor to carry out the steps of:

receiving a private value of the first party in one or more of the packets;

generating one or more public values of the first party using a number n in a first modular exponentiation equation {public value=$g^{(Xi+n)}$ mod p}, wherein the number n differs for each of the communication sessions, Xi represents a private value of the first party, g represents a generator number, and p represents a prime number, and wherein each of the public values is associated with one public value of the second party for each of the communication sessions; and determining for the third party a number m associated with the number n to regenerate the secret key in a second modular exponentiation equation.

14. A method of storing a private value of a first party that facilitates decryption by a third party of messages that are encrypted using the private value in a Diffie-Hellman communication session involving the first party and one or more second parties, comprising the computer-implemented steps of:

communicating a public key value of the escrow center to the first party in an authenticated manner;

receiving an encrypted signed attributed private value that comprises the private value of the first party, encrypted in association with one or more attributes that uniquely identify the first party using the public key of the escrow center, and digitally signed by the first party with a digital signature;

decrypting the encrypted signed attributed private value using a private escrow key of the escrow center that is related to the public key value of the escrow center;

verifying the digital signature of the first party; and storing the encrypted signed attributed private value in secure storage only when the digital signature is verified.

15. A computer-readable medium carrying one or more sequences of instructions for storing a private value of a first party that facilitates decryption by a third party of messages that are encrypted using the private value in a Diffie-Hellman communication session involving the first party and one or more second parties, which instructions, when executed by one or more processors, cause the one or more processors to carry out the steps of:

communicating a public key value of the escrow center to the first party in an authenticated manner;

receiving an encrypted signed attributed private value that comprises the private value of the first party, encrypted in association with one or more attributes that uniquely identify the first party using the public key of the escrow center, and digitally signed by the first party with a digital signature;

decrypting the encrypted signed attributed private value using a private escrow key of the escrow center that is related to the public key value of the escrow center;

verifying the digital signature of the first party; and storing the encrypted signed attributed private value in secure storage only when the digital signature is verified.

16. An apparatus for storing a private value of a first party that facilitates decryption by a third party of messages that are encrypted using the private value in a Diffie-Helman communication session involving the first party and one or more second parties, comprising:

means for communicating a public key value of the escrow center to the first party in an authenticated manner;

means for receiving an encrypted signed attributed private value that comprises the private value of the first party, encrypted in association with one or more attributes that uniquely identify the first party using the public key of the escrow center, and digitally signed by the first party with a digital signature;

means for decrypting the encrypted signed attributed private value using a private escrow key of the escrow center that is related to the public key value of the escrow center;

means for verifying the digital signature of the first party; and means for storing the encrypted signed attributed private value in secure storage only when the digital signature is verified.

17. An apparatus for storing a private value of a first party that facilitates decryption by a third party of messages that are encrypted using the private value in a Diffie-Hellman communication session involving the first party and one or more second parties over a network, comprising:

a data processor;

a network interface that is communicatively coupled to the data processor and communicatively coupled to the network for receiving messages associated with the communication session;

a memory comprising one or more stored sequences of instructions which, when executed by the processor, cause the processor to carry out the steps of:

communicating a public key value of the escrow center to the first party in an authenticated manner;

receiving an encrypted signed attributed private value that comprises the private value of the first party, encrypted in association with one or more attributes that uniquely identify the first party using the public key of the escrow center, and digitally signed by the first party with a digital signature;

decrypting the encrypted signed attributed private value using a private escrow key of the escrow center that is related to the public key value of the escrow center;

verifying the digital signature of the first party; and storing the encrypted signed attributed private value in secure storage only when the digital signature is verified.

18. A method of encrypting one or more messages in one or more communication sessions between a first party and a second party in a manner that facilitates decryption of the messages by a trusted third party, comprising the computer-implemented steps of:

escrowing a private value of the first party that is used to encrypt messages using a Diffie-Hellman key exchange involving the first party and one or more second parties by:

receiving a public key value from an escrow center in an authenticated manner;

associating, with the private value, one or more attributes that uniquely identify the first party, to result in creating and storing an attributed private value;

encrypting the attributed private value using the public key of the escrow center;

transmitting the encrypted attributed private value to the escrow center for secure storage at the escrow center;

generating one or more public values of the first party using a number n in a first modular exponentiation equation {public value=$g^{(Xi+n)}$mod p}, wherein the number n differs for each of the communication sessions, Xi represents the private value of the first party, g represents a generator number, and p represents a prime number, and wherein each of the public values is associated with one public value of the second party for each of the communication sessions;

encrypting the messages using the private value of the first party to result in creating and storing one or more encrypted messages; and communicating the encrypted messages and the public values to the second party.

19. A computer-readable medium carrying one or more sequences of instructions for encrypting one or more messages in one or more communication sessions between a first party and a second party in a manner that facilitates decryption of the messages by a trusted third party, which instructions, when executed by one or more processors, cause the one or more processors to carry out the steps of:

escrowing a private value of the first party that is used to encrypt messages using a Diffie-Hellman key exchange involving the first party and one or more second parties by:

receiving a public key value from an escrow center in an authenticated manner;

associating, with the private value, one or more attributes that uniquely identify the first party, to result in creating and storing an attributed private value;

encrypting the attributed private value using the public key of the escrow center;

transmitting the encrypted attributed private value to the escrow center for secure storage at the escrow center;

generating one or more public values of the first party using a number n in a first modular exponentiation equation {public value=$g^{(Xi+n)}$mod p}, wherein the number n differs for each of the communication sessions, Xi represents the private value of the first party, g represents a generator number, and p represents a prime number, and wherein each of the public values is associated with one public value of the second party for each of the communication sessions;

encrypting the messages using the private value of the first party to result in creating and storing one or more encrypted messages; and communicating the encrypted messages and the public values to the second party.

20. A router that can automatically encrypt one or more messages in one or more communication sessions between a first party and a second party over a network that includes the router, in a manner that facilitates decryption of the messages by a trusted third party, comprising:

a processor;

a network interface that is communicatively coupled to the processor and communicatively coupled to the network for receiving the messages therefrom; and one or more stored sequences of instructions which, when executed by the processor, cause the processor to carry out the steps of:

escrowing a private value of the first party that is used to encrypt messages using a Diffie-Hellman key exchange involving the first party and one or more second parties by:

receiving a public key value from an escrow center in an authenticated manner;

associating, with the private value, one or more attributes that uniquely identify the first party, to result in creating and storing an attributed private value;

encrypting the attributed private value using the public key of the escrow center;

transmitting the encrypted attributed private value to the escrow center for secure storage at the escrow center;

generating one or more public values of the first party using a number n in a first modular exponentiation equation {public value =$g^{(Xi+n)}$mod p}, wherein the number n differs for each of the communication sessions, Xi represents the private value of the first party, g represents a generator number, and p represents a prime number, and wherein each of the public values is associated with one public value of the second party for each of the communication sessions;

encrypting the messages using the private value of the first party to result in creating and storing one or more encrypted messages; and communicating the encrypted messages and the public values to the second party.

* * * * *